United States Patent

Charquet

[11] Patent Number: 5,622,574
[45] Date of Patent: Apr. 22, 1997

[54] PRODUCT EXTERNALLY ALLOYED WITH ZR, METHOD FOR MANUFACTURE OF SAME, AND USE OF SAME

[75] Inventor: Daniel Charquet, Albertbille, France

[73] Assignee: Compagnie Europeenne Du Zirconium Cezus, Courbevoie, France

[21] Appl. No.: 310,040

[22] Filed: Sep. 22, 1994

Related U.S. Application Data

[63] Continuation of Ser. No. 81,165, Jun. 25, 1993, abandoned.

[30] Foreign Application Priority Data

Jul. 9, 1992 [FR] France .................................. 92 08760

[51] Int. Cl.$^6$ .................................................. C22F 1/18
[52] U.S. Cl. .................................. 148/519; 148/672
[58] Field of Search ................ 148/519, 527, 148/672

[56] References Cited

U.S. PATENT DOCUMENTS

| | | | |
|---|---|---|---|
| 4,775,508 | 10/1988 | Sabol et al. | 420/422 |
| 4,810,461 | 3/1989 | Inagaki et al. | 420/422 |
| 4,879,093 | 11/1989 | Garde | 420/422 |
| 4,908,071 | 3/1990 | Anderson et al. | 148/672 |
| 5,112,573 | 5/1992 | Foster et al. | 420/422 |
| 5,125,985 | 6/1992 | Foster et al. | 148/672 |
| 5,242,515 | 9/1993 | Worcester et al. | 420/422 |
| 5,437,747 | 8/1995 | Adamson et al. | 148/519 |

FOREIGN PATENT DOCUMENTS

| 59-179773 | 10/1984 | Japan | 148/519 |
|---|---|---|---|

*Primary Examiner*—George Wyszomierski
*Attorney, Agent, or Firm*—Dennison, Meserole, Pollack & Scheiner

[57] ABSTRACT

A product having at least an exterior surface formed by a Zr alloy comprising the following addition elements (% by weight): Sn 0.40 to 1.70, Fe 0.05 to 0.25, Cr 0.03 to 0.16, Ni less than 0.08; the following maximum amounts of impurities (ppm): Al 75, B 0.5, Cd 0.5, C 270, Co 20, Cu 50, Hf 100, $H_2$ 25, Mg 20, Mn 50, Mo 50, $N_2$ 65, Si 120, Ti 50, W 10, U total 3.5; with the balance being $O_2$ and Zr, wherein the Zr alloy has an Ni content which is greater than 70 ppm and less than 300 ppm.

4 Claims, 2 Drawing Sheets

PRODUCT EXTERNALLY ALLOYED WITH ZR, METHOD FOR MANUFACTURE OF SAME, AND USE OF SAME

This is a divisional of application Ser. No. 08/081,165 filed on Jun. 25, 1993, abandoned.

BACKGROUND OF THE INVENTION

The present invention relates to a product which is externally alloyed with Zr, whether plated or entirely made of the alloy, the method for its manufacture and its use in the most often fashioned or assembled form in a nuclear water reactor.

The two principal zirconium alloys used in nuclear water reactors are zircaloy 2, which contains 1.2 to 1.7% tin, 0.07 to 0.2% iron, 0.05 to 0.15% chromium and 0.03 to 0.08% nickel, and zircaloy 4, which contains 1.2 to 1.7% tin, 0.18 to 0.24% iron and 0.07 to 0.13% chromium, with a maximum content of nickel of 0.007%. These alloys are used for fuel sheathing tubes and for making structural assembly components, and their compositions are set forth in the ASTM B 352 specifications, under the respective designations "R 60802" and "R 60804."

In boiling water reactors, where corrosion is either uniform or of the nodular type, zircaloy 2 is usually used; however zircaloy 4 has been used for the housings and spacers. In pressurized water reactors, where the corrosion is generally uniform, zircaloy 4 is usually used.

Resistance to nodular corrosion is estimated by measurement of the weight gain after testing for 24 hours at 500° C. in steam; resistance to uniform corrosion is estimated by measurement of the weight gain after testing at 400° in pressurized water for 14 days. For corrosion in water and in steam (boiling water), both good resistance to uniform corrosion and good resistance to nodular corrosion are required, as well as a very low rate of hydrogen absorption.

Zircaloy 2 and zircaloy 4 do not act in the same manner with regard to the two forms of corrosion and to hydrogen absorption, and it is difficult to have transformation conditions enabling the use of each alloy with good results in both types of reactors.

Applicant has sought to perfect a product which is more adaptable to these two types of reactors and corrosions.

SUMMARY OF THE INVENTION

The object of the invention is a product having at least an exterior surface formed by a Zr alloy comprising the following addition elements, in % by weight: Sn 0.40 to 1.70, Fe 0.05 to 0.25, Cr 0.03 to 0.16, Ni less than 0.08; the following maximum amounts of impurities (ppm): Al 75, B 0.5, Cd 0.5, C 270, Co 20, Cu 50, Hf 100, $H_2$ 25, Mg 20, Mn 50, Mo 50, $N_2$ 65, Si 120, Ti 50, W 10, U total 3.5; with the balance being $O_2$ and Zr, wherein the Zr alloy has a Ni content which is greater than 70 ppm and less than 300 ppm.

The oxygen content ($O_2$) of the alloy is typically between 500 and 1400 ppm. The limits of the impurities content are those of zircaloy 2 and zircaloy 4 (ASTM B352 specifications). The addition of Ni is no longer an impurity as for zircaloy 4, but a voluntary low addition, tests having shown that Ni causes a surprising improvement in nodular corrosion resistance. It can be said that this is a Zr alloy of the "nickel-doped zircaloy 4" type, and the amount of Sn therein can be lowered to 0.4% in order to improve uniform corrosion resistance.

The improvement in nodular corrosion resistance does not cause an increase in the rate of hydrogen absorption, which remains lower than that of zircaloy 2. The absorption of hydrogen is dependent both on the oxidation reaction of Zr in the water, which forms an oxide of the $ZrO_2$ type and releases hydrogen ($H_2$), and on the absorption of said $H_2$ by the Zr alloy. For an identical weight gain in the tests at 500° C., zircaloy 2 absorbs much more hydrogen than zircaloy 4, which renders the zircaloy 2 progressively more brittle and can reduce its life span. This greater $H_2$ absorption of zircaloy 2, up to 50% more, is attributed in particular to the presence of Ni, approximately 0.05%. The presence of Ni in Zr alloys is generally known as promoting the absorption of hydrogen. However, in the Zr alloy of the invention, the addition of Ni does not cause an increase in the rate of hydrogen absorption. The result of the two above-identified effects, speed of oxidation and reaction $H_2$ absorption, is therefore unexpectedly favorable.

The improvement in nodular corrosion resistance causes the products of the invention to be far less sensitive to the transformation conditions following quenching of the blank from the beta field, preferably with rapid cooling of at least 10° C. per second up to 600° C. Because there is both good resistance to uniform corrosion and good resistance to nodular corrosion, the transformation field providing products which are usable in both types of reactors is greatly enlarged.

The time factor $A=\Sigma t_i \exp(-40,000/T_i)$, in which $t_i$ and $T_i$ respectively are the times of treatment (hours) and the temperatures (Kelvin) of each of the successive thermomechanical and/or mechanical and heat treatments following the beta tempering treatment, is now between $3\times10^{-19}$ hours and $6\times10^{-18}$ hours, whereas the admissible ranges are respectively from $5\times10^{-19}$ hours to $2\times10^{-18}$ hours for zircaloy 4 and from $3\times10^{-19}$ hours to $7\times10^{-18}$ hours for zircaloy 2 (FIG. 2), with the latter viewed as being handicapped in conditions of nodular corrosion because of its relatively high absorption of hydrogen.

The practical benefit is considerable. The information given is good for the overall range of amounts of Sn of the invention (0.4 to 1.7%), with the amount of Sn in the matrix not particularly modifying the growth kinetics of the precipitates and in general the correspondence between the time factor "A" of the product and the development of its resistance or uniform or nodular resistance. This resistance is improved when the amount of Sn decreases substantially and is, for example, between 0.4 and 0.8%, with the alloy then being particularly suitable for use as an exterior layer for sheathing tubes. The question of transformation fields of the products of the invention will be taken up further relative to the method of manufacture and in the examples.

The Zr alloy of the product of the invention has a content of Ni which is preferably at least equal to 100 ppm, with the decrease in weight gain at 500° C. being accompanied by a narrowing of the results. The Ni content is preferably further between 150 and 290 ppm, with the preceding advantages being more apparent and the weight gain at 500° C. being less than or equal to a zircaloy 2 product, with a lower hydrogen absorption rate. The limit of the maximum Ni content prevents a pronounced decrease in the resistance to uniform corrosion for relatively low time factors "A." When the amount of Sn is from 1.2 to 1.7%, and preferably from 1.2 to 1.5%, the Zr alloy is of the zircaloy 4 type modified by the addition of Ni of the invention. This is a zircaloy 4 modified by the addition of nickel, when the content ranges of Fe, Cr, (Fe+Cr+Ni) are those of the R 60804 of ASTM B352, that is: Fe 0.18 to 0.24%, Cr 0.07 to 0.13%, (Fe+Cr+Ni) 0.28 to 0.37%.

The product of the invention is typically in any one of the following forms:

sheathing tube blanks, known as TREX ("tubular reduced extrusion"), or sheathing tubes;

rods or portion of rods, in particular in the form of a plug for a combustible stick, entirely made of Zr alloy in accordance with the invention;

strips, most often having a thickness of 0.3 to 1 mm, or sheets normally having a thickness of 1.5 to 3 mm, and shaped structural parts resulting therefrom, such as spacing grids and housings, respectively.

The sheathing tubes and the blanks for sheathing tubes can have several layers, such as the so-called "duplex" or "triplex" tubes. The layers are metallurgically bonded to one another by co-extrusion, with the exterior layer being of an alloy in accordance with the invention and typically representing at least 3% and preferably from 5 to 15% of the thickness of the tube.

A further object of the invention is a method for manufacture, which can be used to obtain the product of the above-described invention, in which an ingot of Zr alloy is prepared which contains, in % by weight, Sn 0.40 to 1.70, Fe 0.05 to 0.25, Cr 0.03 to 0.16, Ni less than 0.08 and the following maximum amounts of impurities (ppm): Al 75, B 0.5, Cd 0.5, C 270, Co 20, Cu 50, Hf 100, $H_2$ 25, Mg 20, Mn 50, Mo 50, $N_2$ 65, Si 120, Ti 50, W 10, U total 3.5; with the balance being $O_2$ and Zr, which is then rough-shaped using heat into a blank, quenched from the beta field, then transformed by a succession of thermomechanical and/or mechanical and heat treatments, with the temperatures and times of the thermomechanical and heat treatments being adjusted in accordance with a time factor A: $A=\Sigma t_i \exp(-40,000/T_i)$, in which $t_i$ and $T_i$ respectively are the times of treatment (hours) and the temperatures (Kelvin) of each of the successive treatments, with A being limited for the totality of said treatments, wherein the ingot has a content of Ni which is greater than 70 ppm and less than 300 ppm, and preferably wherein the time factor A is between $3\times10^{-19}$ hours and $6\times10^{-18}$ hours.

The introduction of the small amount of Ni indicated provides considerable improvement in the resistance to nodular corrosion of the product obtained without degradation of its resistance to uniform corrosion. In order for these resistances both to be at an excellent level, it is preferable to adjust "A" as indicated, therefore with much greater limits than those attributed to zircaloy 4 products. The method is applied to blanks for duplex or triplex sheathing tubes, with the blank of the Zr alloy in accordance with the invention being, after its quenching from the beta field, assembled with at least an interior blank of a different Zr alloy. The preferred amounts of Ni of the ingot are those already indicated for the product. In order to obtain even more regular corrosion results, "A" is preferably between $4\times10^{-19}$ hours and $5\times10^{-18}$ hours. It has also been determined that the resistance to nodular corrosion can be further improved if the "partial A" time factor, which is calculated in the same manner as "A" but without taking into account the final heat processing, is below $1.6\times10^{-19}$ hours and preferably below $10^{-19}$ hours. When this condition is met, the resistance to nodular corrosion of the reheated final product is improved by selecting a final heat treatment consisting of an annealing treatment at above 720° C., said annealing treatment comprising 2 to 15 minutes above 720° C. and preferably 3 to 10 minutes between 740° C. and 760° C.

A further object of the invention is the use of the product obtained in a boiling water or pressurized water nuclear reactor, with the product being part of a combustible component and being in the form of a structural part.

The invention provides the following advantages:

a) In relation to an alloy product without Ni, such as zircaloy 4, surprising improvement in resistance to nodular corrosion for given transformation conditions;

b) The permissible variations of "A" in order to provide useful products for both types of water reactors are considerably increased: calculation of the A maxi/A mini comfort factor gives 20 for the invention, instead of 4 for zircaloy 4, while zircaloy 2 experiences hydrogen absorption which can be prohibitive;

c) The improvement in resistance to nodular corrosion of the products of the invention does not cause any increase in hydrogen absorption.

EXAMPLES

1. Tests on samples with different amounts of Ni

Samples were prepared from a sheet having a thickness of 1 mm, the transformation of which after quenching in the beta field was carried out under the same conditions with a time factor "A" of $4.7\times10^{-18}$ h, with the final annealing being for 2 hours at 650° C. and the sheets being recrystallized. The variations shown in the results given in Table 1 include a zircaloy 4 reference (Zy 4) containing 18 ppm of Ni and a zircaloy 2 reference (Zy 2) containing 660 ppm of Ni.

Figure 1:
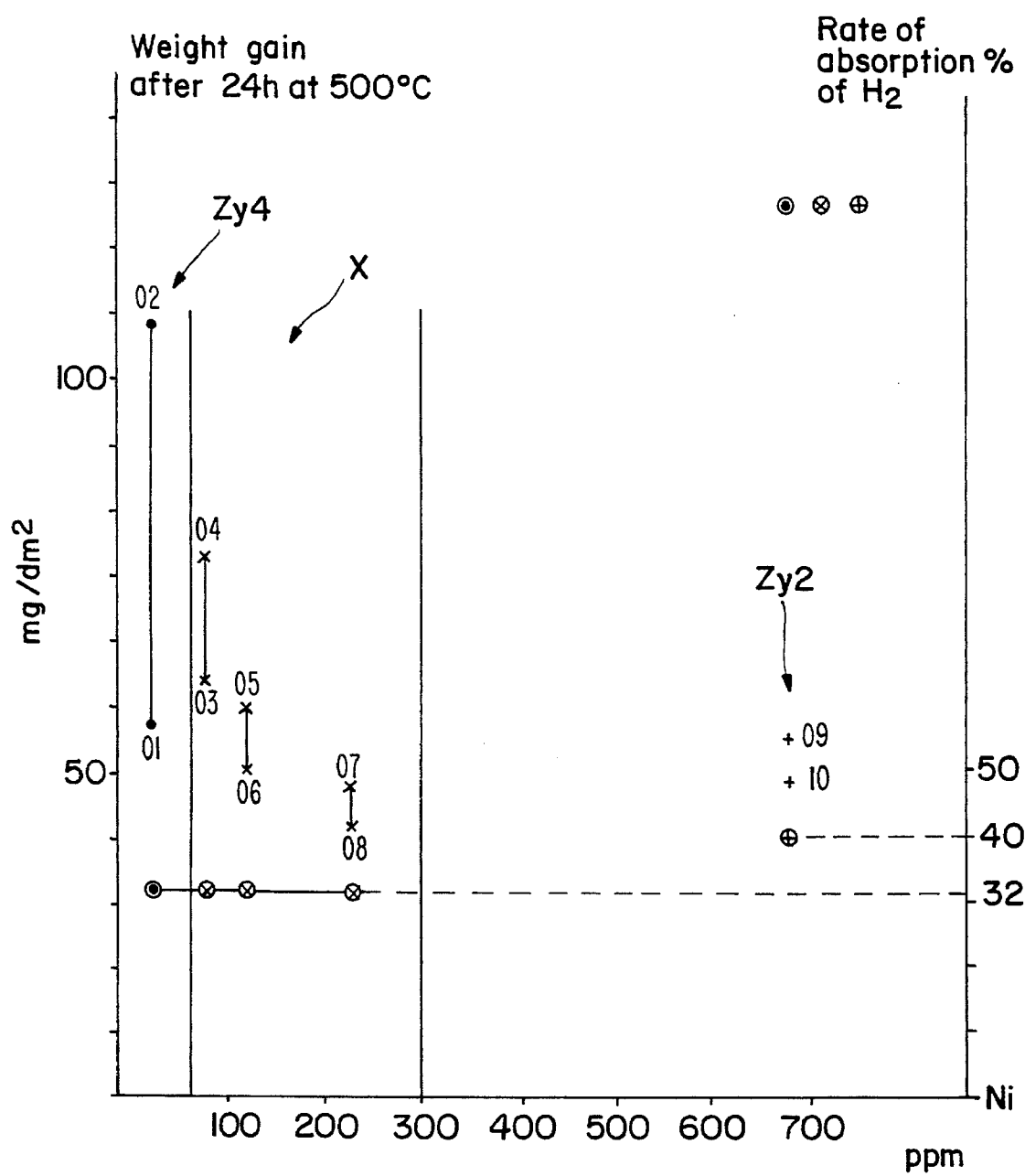
FIG. 1 is a graph of the test results of nodular corrosion on samples with a graded amount of Ni.

The results (Table 1 and FIG. 1) show that the addition of 150 to approximately 180 ppm of Ni (alloy of the invention X) is sufficient to provide resistance to nodular corrosion which is equivalent to that of Zy 2. The dispersion of results strongly decreases as there is an increase in the weight of alloy X to 77 ppm of Ni (tests 03 and 04).

The addition of Ni in samples X does not cause an increase in their rate of hydrogen absorption which remains at a level of 32%, whereas it is 40% for zircaloy 2.

2. Influence of the transformation conditions of the products on resistance to corrosion at 400° C. and at 500° C.

Figure 2:
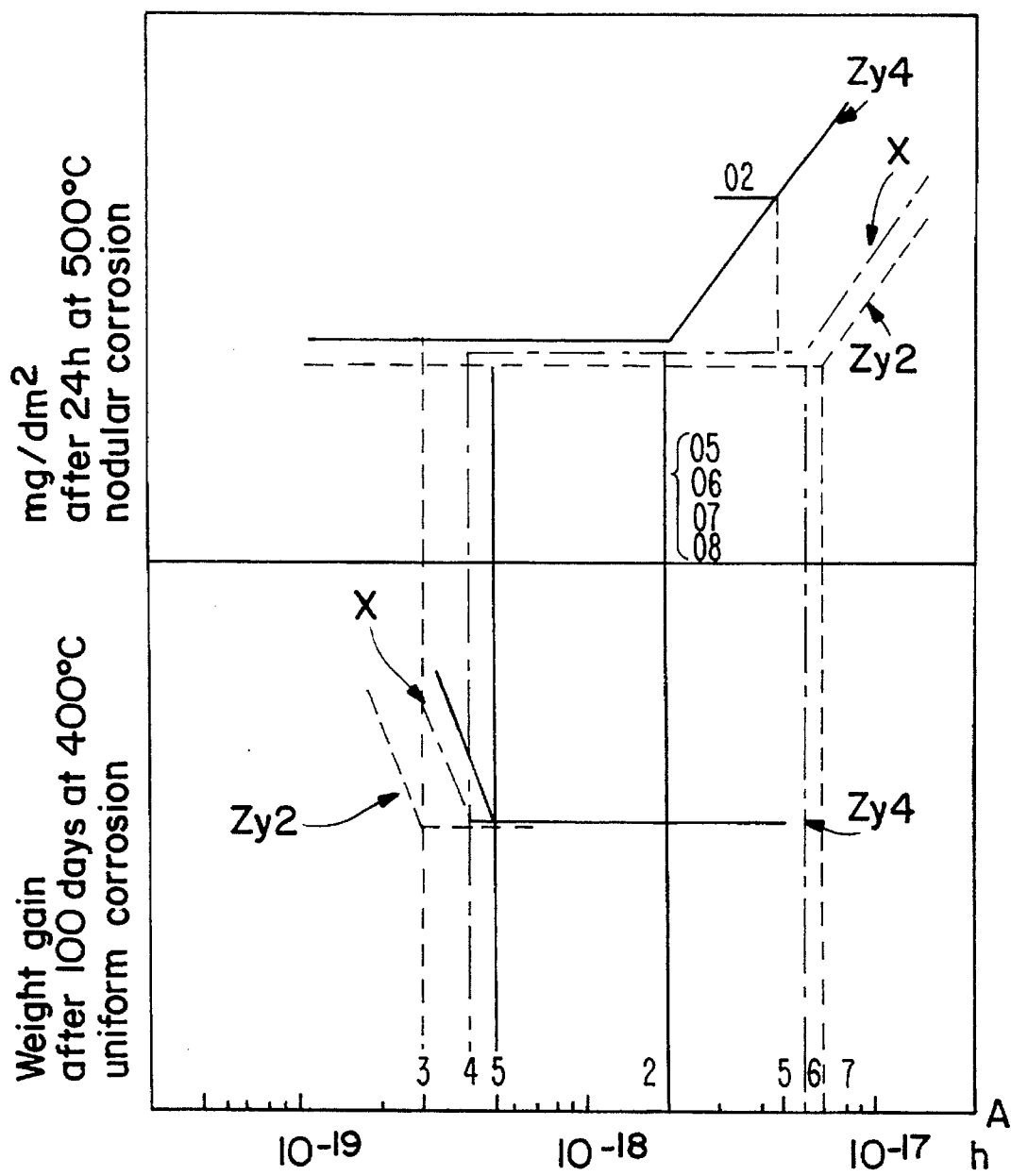
FIG. 2 shows the influence of the transformation conditions of products of zircaloy 2, zircaloy 4, and the alloy in accordance with the invention, with respect to corrosion resistance.

The abscissa on the graph of FIG. 2 shows the time factor "A" (hours) in a logarithmic scale, and the ordinate shows the increases in weight (mg/dm²) observed using two types of tests:

uniform corrosion after 100 days at 400° C., which is an increased time period in relation to the normal 14 day test, and nodular corrosion after 24 hours at 500° C.

The field of "A" where there is good corrosion resistance, judged by the increases in weight, both for uniform corrosion and for nodular corrosion is greater for zircaloy 2 ($3\times10^{-19}$ to $7\times10^{-18}$ hours) than for zircaloy 4 ($5\times10^{-19}$ hours to $2\times10^{-18}$ hours), and the greater sensitivity of zircaloy 4 to the transformation ranges causes corrosion results which are more dispersed than for zircaloy 4.

The results of the preceding tests are shown, in the form of two representative points of samples, on the part of the graph relating to nodular corrosion: test 02 of Zy 4, and an average point corresponding to tests 05 to 08 of alloy X of the invention. It can be seen how the A field of Zy 4 is moved towards longer time periods, that is greater heat comfort for the transformation range.

In the case of uniform corrosion, the modifications in nature and size of the precipitates cause an improvement and enable a lower minimum to be used for the usable range of "A" which is closer to the minimum for Zy 2 or preferably adopting an intermediate value of $4 \times 10^{-19}$ hours.

TABLE 1

Results of nodular corrosion tests for 24 hours at 500° C.

| Reference | Type | Ni Content (ppm) | Weight Gain |
|---|---|---|---|
| 01 | Zy 4 | 18 | 57 |
| 02 | " | " | 118 |
| 03 | X | 77 | 62 |
| 04 | (invention) | " | 73 |
| 05 | | 117 | 59 |
| 06 | | " | 50 |
| 07 | | 212 | 48 |
| 08 | | " | 43 |
| 09 | Zy 2 | 660 | 51 |
| 10 | " | " | 48 |

What is claimed is:

1. A method for manufacturing a Zr alloy product, comprising the steps of:

a) preparing an ingot of a Zr alloy consisting essentially of, by weight, Sn 0.40 to 1.70%, Fe 0.05 to 0.25%, Cr 0.03 to 0.16%, and Ni 150 to 290 ppm, and the following maximum amounts of impurities: Al 75 ppm, B 0.5 ppm, Cd 0.5 ppm, C 270 ppm, Co 20 ppm, Cu 50 ppm, Hf 100 ppm, $H_2$ 25 ppm, Mg 20 ppm, Mn 50 ppm, Mo 50 ppm, $N_2$ 65 ppm, Si 120 ppm, Ti 50 ppm, W 10 ppm, U total 3.5 ppm, and $O_2$ 1400 ppm, alloy balance Zr;

b) hot shaping the ingot to form a blank;

c) quenching the blank from the beta field; and d) transforming the quenched blank by a succession of thermomechanical and/or mechanical and heat treatments, the temperatures and times of said treatments being adjusted according to a time factor: $A = \Sigma t_i \exp(-40,000/T_i)$, in which $t_i$ and $T_i$ are respectively, the times of treatment in hours, and the temperatures of treatment in ° K, wherein time factor A including all said treatments is between $4 \times 10^{-19}$ hours and $5 \times 10^{-18}$ hours, and a partial time factor A' including all said treatments except a final treatment is less than $16 \times 10^{-19}$, said Zr alloy product thereby having a weight gain $\Delta m$ less than about 50 mg/dm$^2$ in a standard nodular corrosion test after 24 hours at 500° C.

2. The method of claim 1, wherein said blank, after quenching from the beta field, is assembled with at least one interior blank made of a different Zr alloy, with said product being a sheathing tube blank or a duplex or triplex sheathing tube.

3. The method of claim 1, wherein a said time factor A' is below $10^{-19}$ hours, and wherein the final heat treatment is annealing for 2 to 15 minutes above 720° C.

4. The method of claim 3, wherein the final heat treatment is for 3 to 10 minutes at 740° to 760° C.

* * * * *